United States Patent
Traeger et al.

(10) Patent No.: US 7,517,371 B2
(45) Date of Patent: Apr. 14, 2009

(54) FLAVORED WOOD PELLET WITH WOOD OIL

(75) Inventors: Joseph P. Traeger, Mt. Angel, OR (US); Mark A. Traeger, Mt. Angel, OR (US); Randolph J. Traeger, Mt. Angel, OR (US); Brian E. Traeger, Mt. Angel, OR (US)

(73) Assignee: Traeger Pellet Grills, Inc., Wilsonville, OR (US)

( * ) Notice: Subject to any disclaimer, the term of this patent is extended or adjusted under 35 U.S.C. 154(b) by 637 days.

(21) Appl. No.: 10/924,430

(22) Filed: Aug. 23, 2004

(65) Prior Publication Data

US 2006/0037236 A1  Feb. 23, 2006

(51) Int. Cl.
*C10L 5/00* (2006.01)
*C10L 5/14* (2006.01)
*C10L 5/40* (2006.01)
*A23B 4/052* (2006.01)

(52) U.S. Cl. .................... 44/550; 44/590; 426/314

(58) Field of Classification Search .................. 44/550, 44/577, 559; 426/314
See application file for complete search history.

(56) References Cited

U.S. PATENT DOCUMENTS

| | | | |
|---|---|---|---|
| 2,341,377 A | 2/1944 | Hinderer | |
| 4,102,653 A | 7/1978 | Simmons et al. | |
| 4,298,435 A * | 11/1981 | Ledford | 201/8 |
| 4,874,396 A * | 10/1989 | McLeod | 44/589 |
| 4,941,889 A | 7/1990 | Holmes | |
| 4,960,438 A | 10/1990 | Benesh et al. | |
| 5,244,472 A * | 9/1993 | Simmons | 44/505 |
| 5,296,004 A * | 3/1994 | Johnson et al. | 44/545 |
| 5,421,836 A | 6/1995 | Ross | |
| 5,427,805 A * | 6/1995 | Crace | 426/314 |
| 5,599,360 A | 2/1997 | Stillman | |

\* cited by examiner

*Primary Examiner*—Glenn Caldarola
*Assistant Examiner*—Jim Goloboy
(74) *Attorney, Agent, or Firm*—Kolisch Hartwell, PC

(57) ABSTRACT

The present invention relates to flavored wood pellets and a method of making flavored wood pellets. The wood pellets of this invention include wood particles, lubricant, and wood oil. Another aspect of the invention is a method that includes mixing wood particles with lubricant and wood oil, heating the mixture, and forming the mixture into pellets.

20 Claims, 2 Drawing Sheets

FLAVORED WOOD PELLET WITH WOOD OIL

BACKGROUND

1. Field of the Invention

The present invention relates to flavored wood pellets containing and made with wood oil.

2. Description of the Related Art

Flavoring briquettes or pellets are commonly used as cooking fuel due to their ability to impart flavor to food during the cooking process. A pellet imparts flavor when smoke released from the pellet during combustion carries flavor to the food. Flavoring pellet examples in the prior art include U.S. Pat. No. 4,102,653, which incorporates spices into a briquette, and U.S. Pat. No. 4,960,438, which incorporates olive oil into a briquette. These briquettes impart certain flavors to food, but they do not provide the characteristic smoked wood flavor of food cooked over an open flame with different types of wood.

Pellets comprising mixtures of wood have been manufactured to provide wood flavor during cooking. Generally, wood that imparts flavor, known as flavor wood, and a wood that does not impart flavor, known as base wood, have been combined to produce pellets that impart wood flavor into food. Mixtures of base and flavor woods have been used because if a wood pellet was made entirely from a flavor wood, then food cooked with that pellet may taste too strong to appeal to most persons.

Accordingly, manufacturers can harvest flavor wood and base wood to blend together in ratios that produce pellets with a desired flavor level. Because flavor wood and base wood are often found in substantially different locations, the flavor wood is typically shipped to a central location for pellet manufacturing. Shipping flavor wood in solid form over substantial distances can result in significant expense. In addition, one must apply onerous initial quality control measures when using solid flavor wood, such as inspection for pests and wood rot. Further, it is often costly to accurately mix flavor wood and base wood to the desired ratio in solid form. Thus, using solid flavor wood to manufacture flavored wood pellets results in numerous disadvantages.

A flavored wood pellet that contained less or completely lacked solid flavor wood and a process for producing such pellets would reduce or eliminate the aforementioned disadvantages to the benefit of both manufactures and consumers.

SUMMARY

The present invention relates to wood pellets and a method of making wood pellets. The inventive wood pellets are comprised of wood particles, lubricant, and wood oil. Another aspect of the invention is a method for making wood pellets including the steps of mixing the wood particles with lubricant and wood oil, heating the mixture, and forming the mixture into pellets.

DETAILED DESCRIPTION

Figure 1:
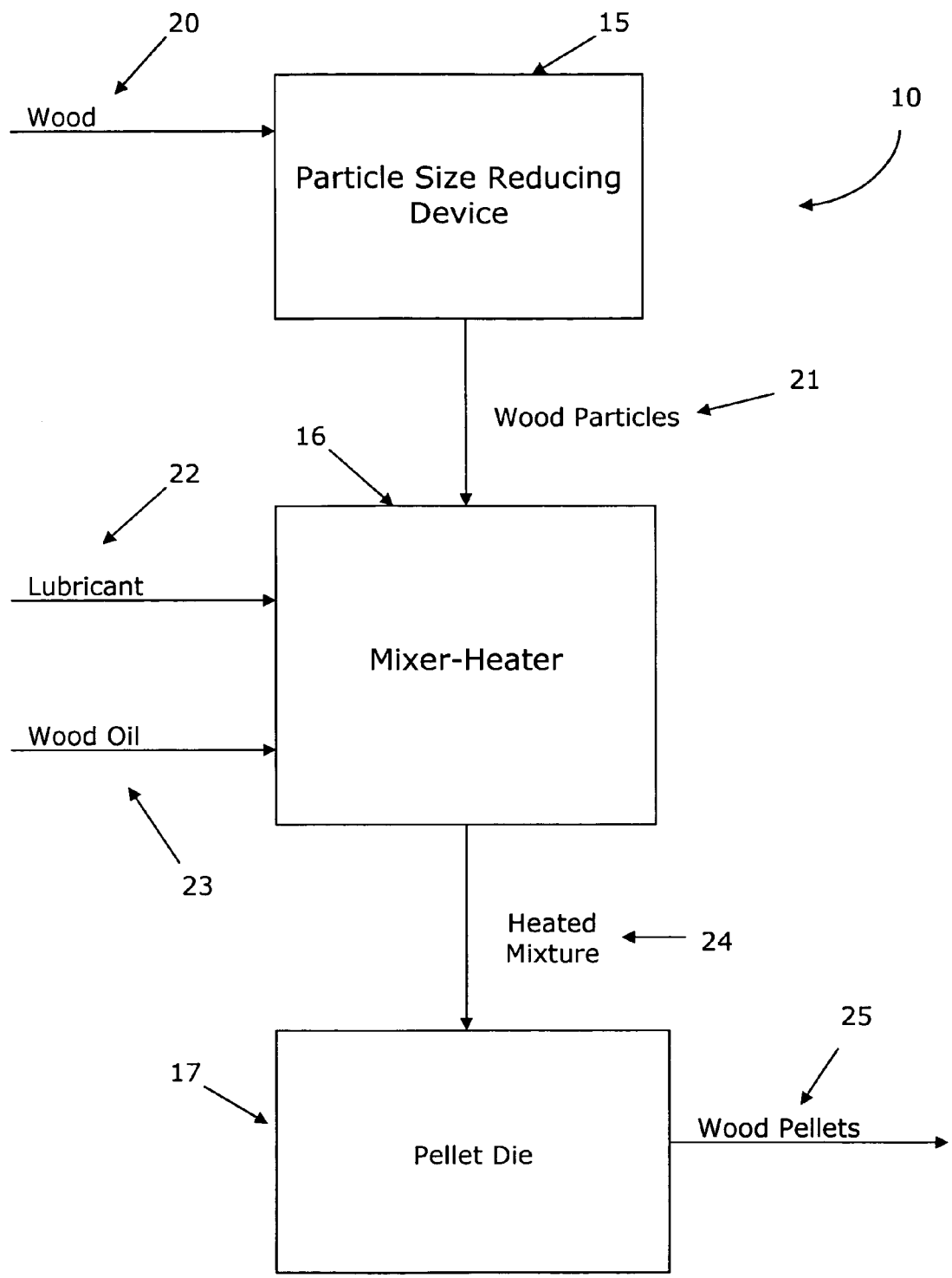
FIG. 1 is a schematic depiction of an embodiment of the invention.
Figure 2:
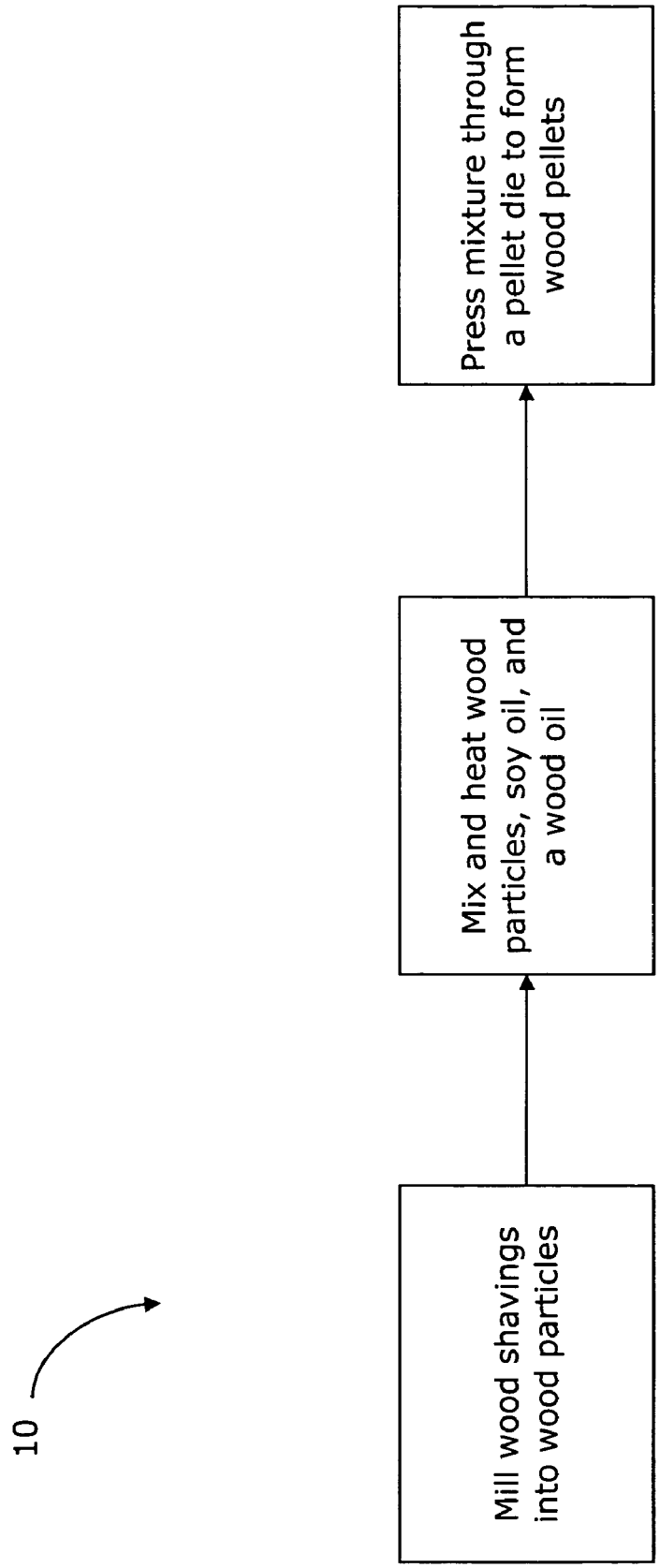
FIG. 2 is a flow diagram depiction of the embodiment of FIG. 1.

An illustrative embodiment of the inventive process for manufacturing wood pellets will be described. As shown in FIGS. 1 and 2, a method 10 of making wood pellets 25 is provided. Base wood 20 is reduced to small particles 21 with a particle size reducing device 15 and mixed with lubricant 22 and wood oil 23 in a mixer-heater 16. The mixture of wood particles 21, lubricant 22, and wood oil 23 is heated in the mixer-heater 16, and the heated mixture 24 is formed into pellets 25 with a pellet die 17.

Alder and oak wood are the preferred base wood materials, however, other wood types may also be used if readily available. The base wood preferably is initially in the in the form of wood shavings, or alternatively, in other forms such as of chunks, chips, sawdust, or whole wood.

The particle size of the base wood is reduced to any particle size compatible with the pelleting process equipment. Reducing the base wood to a fine powder is advantageously utilized in this embodiment. Milling is the preferred particle size reducing method, and particularity, milling using a hammer mill with a #3 screen. Other particle size reducing methods such as chopping, sawing, or shredding could also be used. After milling, the wood particles are dried in the preferred embodiment.

Mixing the lubricant, wood oil, and wood particles may be performed simultaneously or in multiple steps. For example, this embodiment first mixes a lubricant and wood oil together, which may provide certain processing advantages depending on the equipment configuration utilized, prior to mixing further with the wood particles. However, the wood particles and lubricant could alternatively be mixed together prior to adding a wood oil or all three components could be mixed together at the same time. Any order of operations with respect to the mixing of the lubricant, wood oil, and wood particles is within the scope of the invention.

In this embodiment, a lubricant and a wood oil are mixed in a ratio range of 30-50 lbs (pounds) lubricant to 1 lb wood oil. A ratio of 35 lbs lubricant to 1 lb of wood oil is advantageous, but other ratios to produce different flavor levels are within the scope of the invention.

This embodiment utilizes soy oil as a lubricant, but other lubricants, especially other edible lubricants, may be used. Depending on the intended flavor of the pellet, different wood oils are used. For example, hickory wood oil will provide a hickory wood flavor when cooking as compared to a mesquite wood oil which will provide a mesquite wood flavor when cooking. Any wood oil containing a desired flavor is within the scope of this invention, and particularly: apple, alder, cherry, hazelnut, hickory, maple, mesquite, oak, and pecan wood oils.

The mixture of lubricant and wood oil is mixed with wood particles in a ratio range of 1-3 gal (gallon) of lubricant and wood oil mixture to approximately 2000 lbs base wood. The preferred ratio is 2 gal of the lubricant and wood oil mixture to approximately 2000 lbs of base wood. Thus, the overall ratio of components in the preferred pellet embodiment on a weight/weight basis is: 35 parts lubricant, 1 part wood oil, and 130 part wood particles. Another way to determine the proper ratio is to state that 32 lbs of oil can be used to make 2000 lbs of pellets.

In further processing, the lubricant, wood oil, and wood particles mixture is formed into pellets. The favored pellet forming method is to heat the mixture to at least approximately 100 degrees Celsius (100° C.±5° C.) and then to compress and shape the heated mixture with a hard steel pellet die. In addition to a pellet die, other conventional pellet forming equipment may also be used. Pressures of 10,000 psi (pounds per square inch) effectively produce pellets, but higher and lower pressures may be suitable in certain applications.

The wood pellet of this invention can be used when cooking to impart smoked wood flavor to food. The pellets are placed and ignited near food to release heat and smoke. The smoke contains wood flavor from the wood oil contained in the pellet, which is transferred to the food while it cooks. The heat produced by the combustion of the pellet is used to cook the food.

The pellet of this invention and the method of making it provide many advantages as initially discussed in the Background section above. One such advantage is that the pellet produces a smoked wood flavor that can be transferred to food while cooking. Furthermore, different embodiments of the invention can impart different types of smoked wood flavor depending on the wood oil used. Thus, the pellets can provide a wide range of smoked wood flavors to food to satisfy a variety of personal taste preferences.

Additionally advantageous is that the inventive method may be used to produce a flavored wood pellet without using solid flavor wood. Using solid flavor wood to manufacture pellets results in expensive shipping costs, extensive initial quality control, and difficult mixing. In contrast, using wood oil to manufacture pellets reduces shipping costs and streamlines pellet manufacturing. It is possible through the present invention to use solid flavor wood in combination with wood oil, but unlike many prior attempts at producing flavored pellets, it is not necessary to use solid flavor wood to achieve a high quality product that can greatly enhance the barbeque-cooking experience.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A wood pellet comprising:
    a lubricant;
    a wood oil; and
    wood particles, wherein substantially all the wood particles are sized to pass through a No. 3 screen, and wherein the wood pellet is configured to provide a sole source of cooking heat for food, and to provide flavor to the food while the food is cooking.

2. The wood pellet of claim 1, wherein the wood particles include at least one of alder and oak wood particles.

3. The wood pellet of claim 1, wherein the lubricant includes an edible lubricant.

4. The wood pellet of claim 1, wherein the lubricant includes soy oil.

5. The wood pellet of claim 1, wherein the wood oil includes an edible wood oil.

6. The wood pellet of claim 1, wherein the wood oil includes at least one of apple, alder, cherry, hazelnut, hickory, maple, mesquite, oak, or pecan wood oil.

7. The wood pellet of claim 1, wherein the wood oil comprises a mixture of two or more wood oils.

8. The wood pellet of claim 1, wherein the pellet is comprised of approximately 35 parts by weight lubricant, 1 part by weight wood oil, and 130 parts by weight wood particles.

9. A method of making wood pellets from wood particles comprising:
    mixing the wood particles, a lubricant, and a wood oil;
    heating the mixture of wood particles, the lubricant, and the wood oil to at least approximately 100 degrees Celsius; and
    forming the mixture of the wood particles, the lubricant, and the wood oil into a pellet, wherein the pallet is configured to provide a sole source of cooking heat for food, and to provide flavor to the food while the food is cooking, and further wherein substantially all the wood particles in the wood pellets are sized to pass through a No. 3 screen.

10. The method of claim 9, wherein the wood oil comprises a mixture of two or more different wood oils.

11. The method of claim 9, wherein the wood is reduced into wood particles by milling.

12. The method of claim 9, wherein the lubricant and wood oil are mixed together prior to mixing with the wood particles.

13. The method of claim 9, wherein the wood particles, the lubricant, and the wood oil are formed into pellets using compression.

14. The method of claim 9, wherein the wood particles, the lubricant, and the wood oil are formed into pellets using a die.

15. A method of making wood pellets comprising:
    reducing a wood into wood particles, wherein substantially all the wood particles are sized to pass through a No. 3 screen;
    mixing the wood particles, a lubricant, and a wood oil; and
    compressing the mixture of wood particles, the lubricant, and the wood oil into pellets, wherein the pellet is configured to provide a sole source of cooking heat for food, and to provide flavor to food while the food is cooking.

16. The method of claim 15, wherein the wood is reduced into wood particles by milling.

17. The method of claim 15, wherein the wood includes at least one of wood shavings, chunks, chips, sawdust, or whole wood.

18. The method of claim 15, wherein the lubricant and wood oil are mixed together prior to mixing with the wood particles.

19. The method of claim 15, wherein the wood particles, the lubricant, and the wood oil are compressed into pellets using a die.

20. The method of claim 15, wherein the wood oil comprises a mixture of two or more different wood oils.

* * * * *